(12) United States Patent
Breslin et al.

(10) Patent No.: US 8,612,224 B2
(45) Date of Patent: Dec. 17, 2013

(54) SPEECH PROCESSING SYSTEM AND METHOD

(75) Inventors: Catherine Breslin, Cambridge (GB); Mark John Francis Gales, Cambridge (GB); Kean Kheong Chin, Cambridge (GB); Katherine Mary Knill, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 191 days.

(21) Appl. No.: 13/215,711

(22) Filed: Aug. 23, 2011

(65) Prior Publication Data

US 2012/0253811 A1  Oct. 4, 2012

(30) Foreign Application Priority Data

Mar. 30, 2011  (GB) .................................. 1105415.2

(51) Int. Cl.
*G10L 15/06* (2013.01)
(52) U.S. Cl.
USPC ........... 704/245; 704/243; 704/246; 704/249; 704/250; 704/255
(58) Field of Classification Search
USPC ......... 704/245, 243, 246, 231, 500, 270, 235, 704/244, 255, 240, 275, 251, 236, 250, 249
See application file for complete search history.

(56) References Cited

U.S. PATENT DOCUMENTS

| | | | |
|---|---|---|---|
| 4,780,906 A * | 10/1988 | Rajasekaran et al. | 704/251 |
| 5,687,287 A * | 11/1997 | Gandhi et al. | 704/247 |
| 5,865,626 A * | 2/1999 | Beattie et al. | 434/185 |
| 5,963,903 A * | 10/1999 | Hon et al. | 704/254 |
| 6,263,308 B1 * | 7/2001 | Heckerman et al. | 704/231 |
| 6,424,946 B1 * | 7/2002 | Tritschler et al. | 704/272 |
| 6,629,073 B1 * | 9/2003 | Hon et al. | 704/256.4 |
| 6,748,356 B1 * | 6/2004 | Beigi et al. | 704/245 |
| 7,292,977 B2 * | 11/2007 | Liu | 704/236 |

(Continued)

FOREIGN PATENT DOCUMENTS

WO  WO 2006/126216 A1  11/2006

OTHER PUBLICATIONS

United Kingdom Search Report issued on Jul. 1, 2011 in corresponding United Kingdom Application No. 1105415.2 filed on Mar. 30, 2011.

(Continued)

*Primary Examiner* — Vijay B Chawan
(74) *Attorney, Agent, or Firm* — Oblon, Spivak, McClelland, Maier & Neustadt, L.L.P.

(57) ABSTRACT

A method for identifying a plurality of speakers in audio data and for decoding the speech spoken by said speakers;
the method comprising:
receiving speech;
dividing the speech into segments as it is received;
processing the received speech segment by segment in the order received to identify the speaker and to decode the speech, processing comprising:
performing primary decoding of the segment using an acoustic model and a language model;
obtaining segment parameters indicating the differences between the speaker of the segment and a base speaker during the primary decoding;
comparing the segment parameters with a plurality of stored speaker profiles to determine the identity of the speaker, and selecting a speaker profile for said speaker;
updating the selected speaker profile;
performing a further decoding of the segment using a speaker independent acoustic model, adapted using the updated speaker profile;
outputting the decoded speech for the identified speaker, wherein the speaker profiles are updated as further segments of speech relating to a speaker profile are processed.

13 Claims, 2 Drawing Sheets

(56) References Cited

U.S. PATENT DOCUMENTS

| | | | |
|---|---|---|---|
| 7,295,970 B1* | 11/2007 | Gorin et al. | 704/221 |
| 7,346,516 B2* | 3/2008 | Sall et al. | 704/500 |
| 7,668,718 B2* | 2/2010 | Kahn et al. | 704/270 |
| 7,676,363 B2* | 3/2010 | Chengalvarayan et al. | 704/233 |
| 7,881,930 B2* | 2/2011 | Faisman et al. | 704/235 |
| 7,930,179 B1* | 4/2011 | Gorin et al. | 704/246 |
| 2008/0147396 A1* | 6/2008 | Wang | 704/246 |
| 2009/0319269 A1 | 12/2009 | Aronowitz | |
| 2010/0179811 A1 | 7/2010 | Gupta et al. | |
| 2011/0099015 A1* | 4/2011 | Zopf | 704/270 |
| 2011/0119060 A1 | 5/2011 | Aronowitz | |
| 2012/0209609 A1* | 8/2012 | Zhao et al. | 704/249 |
| 2012/0251843 A1* | 10/2012 | Yan et al. | 428/800 |
| 2012/0323575 A1* | 12/2012 | Gibbon et al. | 704/246 |

OTHER PUBLICATIONS

Sue E. Tranter et al., "An Overview of Automatic Speaker Diarization Systems", IEEE Transactions on Audio, Speech, and Language Processing, vol. 14, No. 5, Sep. 2006, pp. 1557-1565.

Jürgen Geiger et al., "GMM-UBM Based Open-Set Online Speaker Diarization", Interspeech, Sep. 26-30, 2010, pp. 2330-2333.

A. K. Sarkar et al., "Fast Computation of Speaker Characterization Vector using MLLR and Sufficient Statistics in Anchor Model Framework", Interspeech, Sep. 26-30, 2010, pp. 2738-2741.

\* cited by examiner

SPEECH PROCESSING SYSTEM AND METHOD

CROSS REFERENCE TO RELATED APPLICATIONS

This application is based upon and claims the benefit of priority from United Kingdom Patent application No. GB1105415.2, filed Mar. 30, 2011; the entire contents of which are incorporated herein by reference.

FIELD

Embodiments of the present invention relate generally to speech processing systems and methods

BACKGROUND

Diarization is generally referred to as the task of finding and classifying homogeneous segments in an audio stream for the purpose of further processing. For example, in a meeting, diarisation can apply to the task of taking the audio stream for that meeting and identifying who spoke when. Speech recognition is the task of decoding the audio received into text and speaker adaptation is, in very general terms, the ability of a speech recognition system to adapt and hence decode speech from different speakers. An auto-integrated system is one which combines diarization and recognition with adaptation to give a transcript of who said what and when.

BRIEF DESCRIPTION OF THE DRAWINGS

The present invention will now be described with reference to the following embodiments in which.

DETAILED DESCRIPTION

Figure 1:
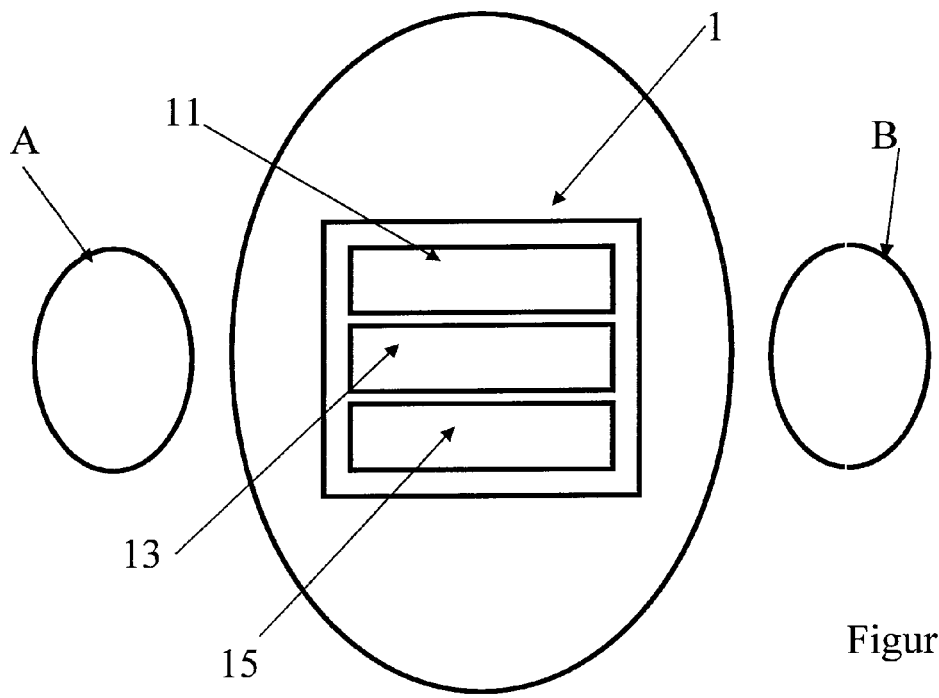
FIG. 1 is a schematic of a system in accordance with an embodiment of the present invention in use in a meeting.

According to one embodiment, a method is provided for identifying a plurality of speakers in audio data and for decoding the speech spoken by said speakers;
the method comprising:
receiving speech;
dividing the speech into segments as it is received;
processing the received speech segment by segment in the order received to identify the speaker and to decode the speech, processing comprising:
performing primary decoding of the segment using an acoustic model and a language model;
obtaining segment parameters indicating the differences between the speaker of the segment and a base speaker during the primary decoding;
comparing the segment parameters with a plurality of stored speaker profiles to determine the identity of the speaker, and selecting a speaker profile for said speaker;
updating the selected speaker profile;
performing a further decoding of the segment using a speaker independent acoustic model, adapted using the updated speaker profile;
outputting the decoded speech for the identified speaker, wherein the speaker profiles are updated as further segments of speech relating to a speaker profile are processed.

Embodiments of the present invention are concerned with so-called integrated auto-diarisation system which can identify the speakers at a meeting and decode the speech from those speakers. This allows an automatic transcript of the meeting to be produced on-line or as the audio progresses identifying who said what and when.

If the segment parameters do not match closely enough with a stored speaker profile, in an embodiment, a new speaker profile is initialised based on the statistics obtained for the current segment and any relevant prior knowledge.

In an embodiment, obtaining segment parameters comprises obtaining the parameters which allow a speaker transform to be obtained, said speaker transform adapting the speaker independent or canonical model to the new speaker.

The speaker transform may be an adaptation transform. In a further embodiment, the speaker transform is an MLLR or CMLLR transform. The speaker transform may comprise both adaptive and prior statistics.

The primary decoding uses a language model or grammar model. In an embodiment, this is a 4-gram model, but lower or higher order models may also be used. In a further embodiment, no language model is used and the secondary decoding comprises rescoring a lattice of possible text corresponding to the segment. In a yet further embodiment a language model is used in the secondary decoding.

Dividing the input speech into segments may comprise detecting where there is silence in the input speech or where the speaker changes.

In an embodiment, the base speaker is a canonical speaker and a speaker independent acoustic model is used. In a further embodiment, the base speaker is a previous speaker and the acoustic model used in the primary decoding is adapted for the previous speaker.

In a further embodiment, a system is provided for identifying a plurality of speakers in audio data and for decoding the speech spoken by said speakers;
the system comprising:
a receiver for audio containing speech; and
a processor, said processor being adapted to:
divide the speech into segments as it is received;
process the received speech segment by segment in the order received to identify the speaker and to decode the speech, processing comprising:
perform primary decoding of the segment using an acoustic model and a language model;
obtain segment parameters indicating the differences between the speaker of the segment and a base speaker during the primary decoding;
compare the segment parameters with a plurality of stored speaker profiles to determine the identity of the speaker, and selecting a speaker profile for said speaker;
update the selected speaker profile; and
perform a further decoding of the segment using a speaker independent acoustic model, adapted using the updated speaker profile,
the system further comprising an output for outputting the decoded speech for the identified speaker,
wherein the speaker profiles are updated as further segments of speech relating to a speaker profile are processed.

Methods and systems in accordance with embodiments can be implemented either in hardware or on software in a general purpose computer. Further embodiments can be implemented in a combination of hardware and software. Embodiments may also be implemented by a single processing apparatus or a distributed network of processing apparatuses.

Since methods and systems in accordance with embodiments can be implemented by software, systems and methods in accordance with embodiments may be implanted using computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

FIG. 1 is a schematic of a system in accordance with an embodiment of the present invention.

The integrated auto-diarisation and speech recognition system 1 can be used for an audio stream where there are a number of speakers. In the arrangement of FIG. 1, there is speaker A and speaker B. However, it will be appreciated that the system could be extended to a large number of speakers. The system 1 is provided on a table in FIG. 1 between speaker A and B. However, it could be placed anywhere in the room providing that the system was capable of detecting speech signals from the speakers at the meeting.

The system 1 in FIG. 1 is shown on a table taking speech inputs from two nearby speakers. However, the system could also be integrated into a speaker for example of a telephone conferencing system where it was not physically located close to every speaker but instead received speech signals over a telephone line, internet connection etc.

The system 1 comprises a voice input module 11. Voice input module 11 can be a microphone or configured to receive speech inputs from telephone lines, over the internet etc. The voice input module 11 will then output speech signals into identification and decoding section 13. Identification and decoding section 13 will be described in more detail with reference to FIG. 2. The output from identification and decoding module 13 is then outputted to output module 15. Output module 15 in one embodiment will output a transcription of the meeting with the speech spoken by each speaker listed. The transcript may identify the speaker with the speech spoken by that speaker in chronological order.

Figure 2:
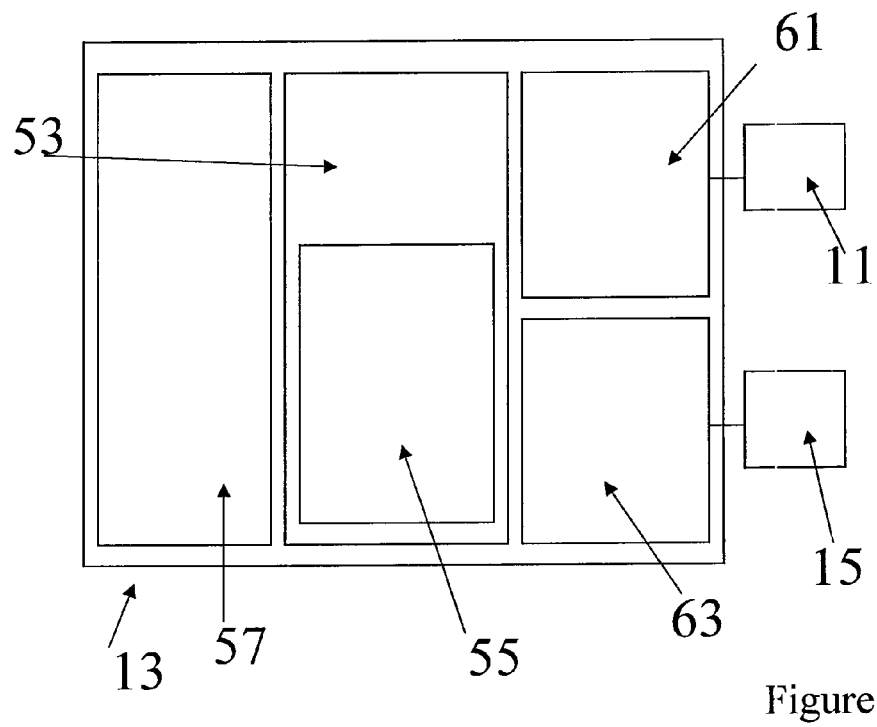
FIG. 2 is a schematic of the system of FIG. 1 in more detail.

FIG. 2 is a schematic of the diarisation system 1 of FIG. 1. The system 1 comprises an identification and decoding section 13, a voice input 11 and an output 15.

The identification and decoding section 13 comprises processor 53 which runs voice conversion application 55. The section 13 is also provided with memory 57 which communicates with the application as directed by the processor 53. There is also provided a front end unit 61 and an output preparation module 63.

Front end unit 61 receives a speech input from voice input 11. Voice input 11 may be a microphone, microphone array or maybe received from a storage medium, streamed online etc. The front end unit 61 digitises the received speech signal and splits it into frames of equal lengths. The speech signals are then subjected to a spectral analysis to determine various parameters which are plotted in an "acoustic space" or feature space. The parameters which are derived will be discussed in more detail later.

The front end unit 61 also removes signals which are believed not to be speech signals and other irrelevant information. Popular front end units comprise apparatus which use filter bank (F BANK) parameters, Mel Frequency Cepstral Coefficients (MFCC) and Perceptual Linear Predictive (PLP) parameters. The output of the front end unit 61 is in the form of an input vector which is in n-dimensional acoustic space.

Front end unit 61 then communicates the input data to the processor 53 running application 55. Application 55 outputs data corresponding to the text of the speech input via module 11 and also identifies the speaker of the text.

The application 55 comprises a decoder, an acoustic model and a language model. The acoustic model section will generally operate using Hidden Markov Models. However, it is also possible to use acoustic models based on for example, connectionist models and hybrid models.

The acoustic model derives the likelihood of a sequence of observations corresponding to a word or part thereof on the basis of the acoustic input alone.

The language model contains information concerning probabilities of a certain sequence of words or parts of words following each other in a given language. Generally a static model is used. The most popular method is the N-gram model.

The decoder then traditionally uses a dynamic programming (DP) approach to find the best transcription for a given speech segment using the results from the acoustic model and the language model.

This data is then output to output preparation module 63 which converts the data into a form to be output by output 15. Output 15 may be a display on a screen, a printout or a file may be directed towards a storage medium, streamed over the Internet or directed towards a further program as required. In one embodiment, the text output is translated into a further language.

The acoustic model which is to be used for speech recognition will need to cope under different conditions such as for different speakers and/or under different noise conditions.

The above overview of speech recognition has not considered the case of multiple different speakers. Systems and methods in accordance with embodiments of the present invention handle speech recognition from a plurality of different speakers.

Systems and methods in accordance with embodiments of the present invention adapt the acoustic model to the different speakers.

Speaker adaptation methods such as like Maximum Likelihood Linear Regression (MLLR) and Constrained MLLR (CMLLR) can be used.

In the adaptation technique of CMLLR each speech observation vector $o_t$ is transformed by a linear transform $W^{(r)} = [A^{(r)} b^{(r)}]$ $$\tilde{o}_t = A^{(r)} o_t + b^{(r)} \qquad (1)$$

Where $o_t$ is the feature vector or speech vector to be transformed and $\tilde{o}_t$ is the feature vector after transformation.

Many voice recognition systems use Hidden Markov Models (HMMs) where the HMMs have states with output distributions. The output distributions are often based on Gaussian Mixture Models (GMMs) with each component m of a GMM being a Gaussian defined by its mean and variance.

For such a system, equation (1) yields likelihood $$p(o_t|m) = |A^{(r)}| \mathcal{N}(A^{(r)} o_t + b^{(r)}; \mu^{(m)}, \Sigma^{(m)}) \qquad (2)$$

for component m in regression class r that has mean and variance $\mu^{(m)}$ and $\Sigma^{(m)}$.

To estimate the CMLLR transform parameters W using maximum likelihood, the auxiliary function $Q(W, \tilde{W})$ is used $$Q(W, \tilde{W}) = \sum_t \sum_m \gamma_t^{(m)} \log\left(|A| \mathcal{N}\left(A o_t + b; \mu^{(m)}, \sum{}^{(m)}\right)\right) \qquad (3)$$

The $i^{th}$ row of the transform can be estimated iteratively using $$W_i^{(r)} = (\lambda p_i + k_i^{(r)}) G_i^{(r)-1} \qquad (4)$$

Where $p_i$ is the extended co-factor row vector of $A^{(r)}$ and $\lambda$ satisfies the quadratic equation $$\lambda^2 p_i G_i^{(r)-1} p_i^T + \lambda p_i G_i^{(r)-1} k_i^{(r)T} - \beta^{(r)} = 0 \quad (5)$$

CMLLR transforms are normally estimated from a set of statistics $G_i^{(r)}$, $k_i^{(r)}$ and $\beta^{(r)}$ accumulated from data.

$$G_i^{(r)} = \sum_{m \in r} \frac{1}{\sigma_i^{(m)2}} \sum_{t=1}^{T} \gamma_t^{(m)} \begin{bmatrix} 1 & o_t^T \\ o_t & o_t o_t^T \end{bmatrix} \quad (6)$$

$$k_i^{(r)} = \sum_{m \in r} \frac{\mu_i^{(m)}}{\sigma_i^{(m)2}} \sum_{t=1}^{T} \gamma_t^{(m)} [\, 1 \quad o_t^T \,] \quad (7)$$

$$\beta^{(r)} = \sum_{m \in r} \sum_{t=1}^{T} \gamma_t^{(m)} \quad (8)$$

Where $\gamma_t^{(m)}$ is the posterior probability that frame $o_t$ is aligned with component m. For convenience, the dependence on the regression class r is dropped below.

By using an adaptation framework of the above type, it is possible to adapt the input vectors for a speaker to that of a canonical speaker for which the acoustic model has been trained.

Multiple speakers can be handled in such a system by establishing a set of adaptation transforms for each speaker. In the above CMLLR example, a set of statistics $G_i^{(r)}$, $k_i^{(r)}$ and $\beta^{(r)}$ can be accumulated for each speaker and from these statistics, a transform is estimated.

In a method in accordance with this embodiment, speaker clustering and adaptation is performed where individual speakers are represented by CMLLR transforms, and those transforms are used for both speaker clustering and adaptation.

In a method in accordance with an embodiment, Speaker s is represented by a speaker profile $P^{(s)}$ containing a set of statistics, $G_i^{(s)}$, $k_i^{(s)}$ and $\beta^{(s)}$ and the adaptation transform $W^{(s)}$ estimated from those statistics. At any time, the set of profiles $$\mathcal{P} = [P^{(1)} \ldots P^{(S)}]$$

represents all the speakers that have been seen thus far. A further set of transforms represent 'generic' speakers:

$$[W^{(A)}, W^{(B)} \ldots]$$

For example, this set could contain an identity transform, training data transforms, male and female speaker transforms etc. The complete set of transforms is given by $$\mathcal{W} = [W^{(1)} \ldots W^{(S)}, W^{(A)}, W^{(B)} \ldots]$$

For each new segment, a first-pass hypothesis is obtained. In a multi-pass decoding framework, speaker identity is not normally used in the first pass. Next, the segment specific statistics $G_i^{(u)}$, $k_i^{(u)}$ and $\beta^{(u)}$ are accumulated using the forward-backward algorithm and this first-pass hypothesis $$G_i^{(u)} = \sum_m \frac{1}{\sigma_i^{(m)2}} \sum_{t=1}^{T} \gamma_t^{(m)} \begin{bmatrix} 1 & o_t^T \\ o_t & o_t o_t^T \end{bmatrix} \quad (9)$$

$$k_i^{(u)} = \sum_m \frac{\mu_i^{(m)}}{\sigma_i^{(m)2}} \sum_{t=1}^{T} \gamma_t^{(m)} [\, 1 \quad o_t^T \,] \quad (10)$$

$$\beta^{(u)} = \sum_m \sum_{t=1}^{T} \gamma_t^{(m)} \quad (11)$$

The auxiliary function that approximates the segment likelihood, Q(W), is given by:

$$Q(W) = \sum_t \sum_m \gamma_t^{(m)} \log(|A| \mathcal{N}(Ao_t + b; \mu^{(m)}, \Sigma^{(m)})) \quad (12)$$

$$= T \log |A| - \frac{1}{2} \left\{ \sum_{i=1}^{D} w_i G_i^{(u)} w_i^T - 2 k_i^{(u)} w_i^T \right\}$$

For diagonal covariances, the set of transforms W described above can be used directly to select the transform $\hat{W}$ which yields the highest segment likelihood:

$$\hat{W} = \underset{W \in \mathcal{W}}{\operatorname{argmax}} Q(W) \quad (13)$$

If one of the speaker-specific transforms $[W^{(1)} \ldots W^{(S)}]$ is selected, then the corresponding speaker profile is updated by adding the current segment statistics to those stored in the profile $$G_i^{(s)} \leftarrow G_i^{(s)} + G_i^{(u)} \quad (14)$$

$$k_i^{(s)} \leftarrow k_i^{(s)} + k_i^{(u)} \quad (15)$$

$$\beta^{(s)} \leftarrow \beta^{(s)} + \beta^{(u)} \quad (16)$$

and the transform $W^{(s)}$ recomputed. If one of the 'generic' speaker transforms $[W^{(A)}, W^{(B)} \ldots]$ is selected, then a new speaker profile $P^{(S+1)}$ is initialised. To obtain a robust transform estimate in the first instance, the statistics for this profile may b initialised with the selected generic transform as prior. That is, statistics for estimating the CMLLR transform, $G_i^{(s)}$ and $k_i^{(s)}$ are based on interpolating segment-based and prior statistics $$G_i^{(s)} = G_i^{(u)} + \tau \frac{G_i^{(pr)}}{\sum_m \gamma^{(m)}} \quad (17)$$

$$k_i^{(s)} = k_i^{(u)} + \tau \frac{k_i^{(pr)}}{\sum_m \gamma^{(m)}} \quad (18)$$

$$\beta^{(s)} = \beta^{(u)} + \tau \frac{\beta^{(pr)}}{\sum_m \gamma^{(m)}} \quad (19)$$

The prior statistics are normalised so that they effectively contribute $\tau$ frames to the final statistics.

The prior statistics are given by:

$$G_i^{(pr)} = \sum_m \frac{\gamma^{(m)}}{\sigma_i^{(m)2}} \begin{bmatrix} 1 & \varepsilon\{o^T|m\} \\ \varepsilon\{o|m\} & \varepsilon\{oo^T|m\} \end{bmatrix} \quad (20)$$

$$k_i^{(pr)} = \sum_m \frac{\gamma^{(m)} \mu_i^{(m)}}{\sigma_i^{(m)2}} [\, 1 \quad \varepsilon\{o^T|m\} \,] \quad (21)$$

$$\beta^{pr} = \sum_m \gamma^{(m)} \qquad (22)$$

where $\epsilon\{o|m\}$ ands $\epsilon\{oo^T|m\}$ are estimated from a target distribution for each component and $\gamma^{(m)}$ is the component occupancy from training data. This can be implemented as a set of statistics accumulated offline from training data, modified by the inverse of the generic transform at runtime.

In the above described embodiment, a current segment is either assigned to an existing speaker profile, or a new speaker profile is created. The adaptation transform from that profile can be used immediately to perform adaptation and to re-decode the current segment in a multi-pass decoding framework.

Figure 3:
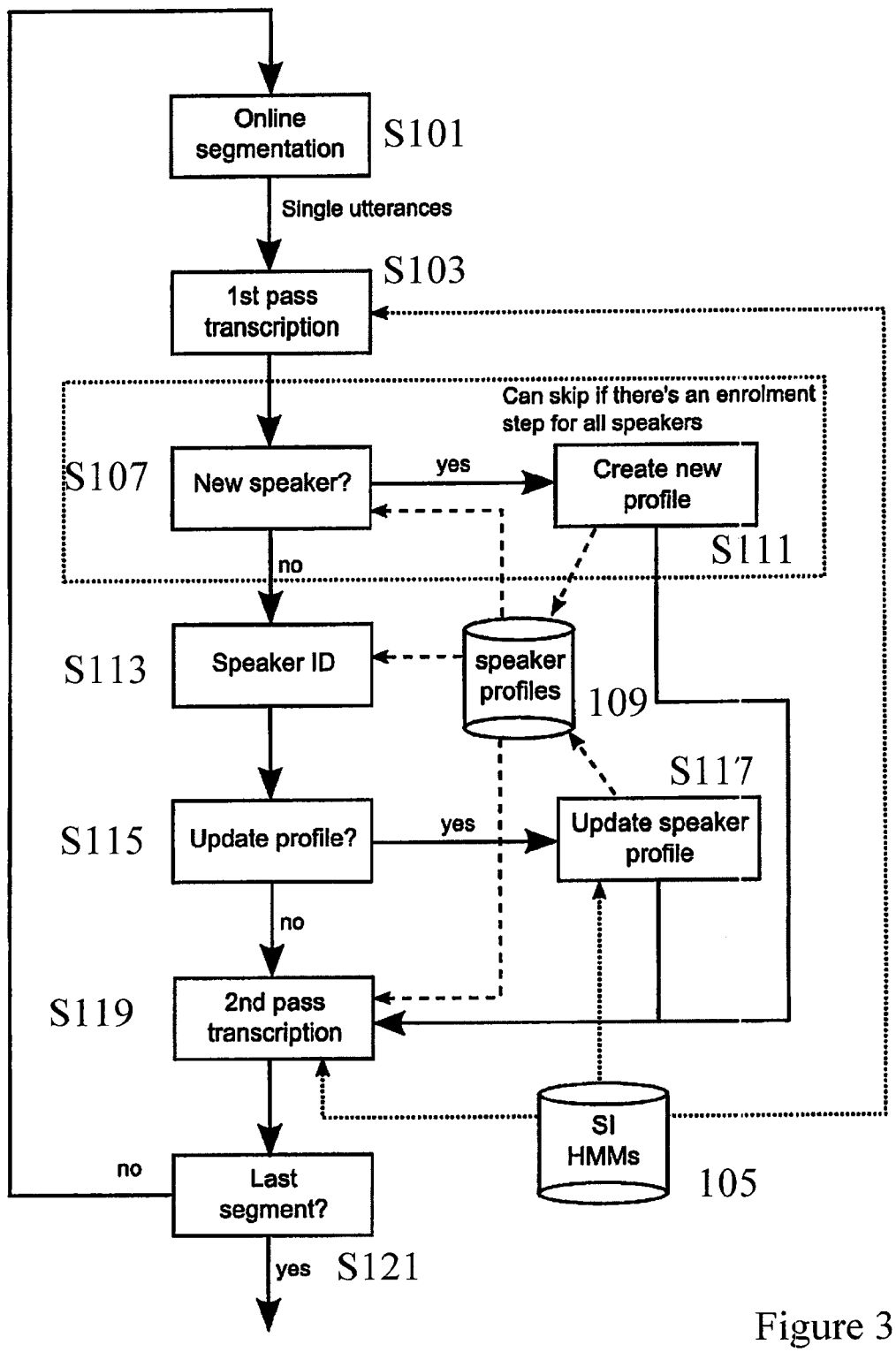
FIG. 3 is a flow diagram illustrating a method in accordance with an embodiment of the present invention.

FIG. 3 is a flow diagram showing a method in accordance with an embodiment of the present invention. The method may be used with the type of system described with reference to FIG. 1. Using the terminology of FIG. 1, and for simplicity assuming that there are just two speakers, speaker A and speaker B, when the first speaker, speaker A starts to speak, the system will switch on.

In step S101, the speech will be broken into segments. The segments will contain one or more words. In one embodiment, the segments are selected so that a whole segment corresponds to the speech of just one speaker. This may be achieved for example by using a detector which can determine the difference between speech and silence. The silent portions segregate the speech into segments. For example, a GMM (Gaussian mixture model) speech/silence detector may be used.

In a further embodiment, the output of the speech recognition stage (described below) can be used. For example, if the speech recognition stage indicates silence with high confidence, a boundary between segments can be set. This avoids the need for a separate module.

The system may be provided with a push to talk interface where a user pushes a button on the system to indicate that they are starting to speak. The input from this can be used to segment the speech.

Once the first segment has been determined, it is then passed into primary transcription stage in step S103. In this embodiment, speech is represented by a set of speaker independent or canonical hidden Markov models (HMMs 105). These speaker independent HMMs are stored in database 105. In order to perform recognition step S103, speaker independent HMMs 105 are used. In an embodiment, the primary transcription stage will also use a language model. However, as this is a primary transcription stage and a further transcription stage will take place later, usually a lower order language model such as a bigram can be used.

A hypothesis for the input speech will be first determined in step S103 and from this, a forward/backward algorithm using HMMs is carried out to determine statistics for the segment. In this particular embodiment, the statistics for CMLLR are used.

However, other types of speaker adaptation could be used. For example MLLR, with prior, noise robustness or any combination thereof.

Confidence measures can also be used during the forward-backward pass to weight the resulting statistics.

In this embodiment, in step S107, it is then determined whether or not the speaker is a new speaker. Speakers who have already been introduced to the system will have a speaker profile stored in speaker profile database 109. A speaker identified as a new speaker in step S107 will not have a pre-stored speaker profile in the speaker profile database 109. There are many different ways of determining whether or not a speaker is a new speaker in step S107. For example:

1) The identity transform could be used, if the identity transform gives a higher likelihood or value of auxiliary function Q than those obtained from the other transforms from the set of speaker profiles, this indicates that there could be a new speaker; or 2) Similarly, a generic speaker transform could be used, if this gives a higher likelihood value or auxiliary function than those obtained from the other transforms from the set of speaker profiles, this indicates that there could be a new speaker; or 3) Another approach would be to look at the likelihoods or values of auxiliary functions derived from adaptation transforms from the set of speaker profiles, if this is below a threshold, it may indicate that there is a new speaker.

If it is determined from step S107 that there is a new speaker, a new speaker profile is created and initialised in step S111 and the new speaker profile is saved in speaker profiles S109. A speaker profile will be generated in step S111 using the statistics derived for that speaker in primary transcription and any appropriate prior information.

If the segment is not from a new speaker, it is assigned to one of the existing speaker profile by selecting the profile with the derived adaptation transform that maximises the auxiliary function Q given the statistics derived in step S103. This is similar to the procedure used in some implementations of Vocal Tract Length Normalisation (VTLN) which select a warping transform from among pre-computed sets to maximise the auxiliary function Q.

The speaker ID is allocated in step S113. This will either be a new speaker or one of the existing speakers whose profile has been created in a database in step S109.

In step S115, if the speaker is recognised it is then determined whether or not the profile needs to be updated. In one embodiment, speed or computational resources may be considered when deciding whether or not to update a profile.

If it is determined that the speaker profile should be updated, the speaker profile is updated in step S117 which updates the relevant profile in the speaker profile database 109. The updating is done by adding the current segment statistics to those of the best profile and re-estimating the transform.

In step S119, a second pass transcription is performed. The second pass transcription decodes the data using the updated speaker profile and the speaker independent HMMs 105. In one embodiment, a higher order language model is used in the first pass, and only the lattice is rescored in this second pass in step S119.

The system then determines if it has processed the last segment. If it has not, then it returns to step S101 and the next segment is analysed in the same way. The speaker profiles are being continually updated and are used both for recognising the speaker and performing the final transcription. By sharing information between the speaker ID and speech recognition stages, the speaker identification and the speaker recognition stages leverage off one another. Word level information and confidence scores can be used in the speaker ID stage and efficiency savings exist in the speech recognition stages. As they have been already accumulated in the speaker clustering stage, there is no need to compute the relevant statistics for adaptation. The profiles can be stored for future sessions.

Therefore, the above embodiment of integrated diarisation and automatic speech recognition leads to fast online recognition of continuous audio streams, with efficient use of memory as data and data structures can be shared between speaker identification and speech recognition subtasks. Further, in the above embodiment the use of the auxiliary function to approximate likelihood allows for very efficient speaker identification as segment statistics need only be computed once for the speaker independent or canonical HMMs rather than multiple times for each existing speaker profile.

The use of shared statistics allows confidence scores to be easily integrated into both the speaker ID and recognition stages.

In the above embodiment, the updated speaker profile is used to derive an adaptation transform for the current segment. This adaptation transform is then used to adapt the HMMs, re-decode the current segment and improve the hypothesis. This process can optionally be repeated.

However, in a further embodiment, it is assumed that the speaker doesn't change between segments. The adaptation transform derived from the speaker profile for the previous segment is used to obtain the segment hypothesis and/or statistics, before proceeding with the speaker identification step. If the speaker has changed, then the segment can be re-recognised using the transform derived from the correct speaker profile.

In the embodiment described with reference to FIG. 3, a new speaker profile is created when a new speaker is seen. In practice, a speaker profile could represent a cluster of speakers where their data is pooled. In a further embodiment, multiple speaker profiles represent a single speaker in, for example, different environmental conditions. In these cases, the creation of a new speaker profile and the speaker identification stage can be modified to reflect these definitions.

In an embodiment, speaker profiles (i.e. statistics and transforms) can be cached over multiple sessions.

Any form of transform can be used, such as with a prior, discriminatively estimated, from noise robustness techniques etc.

Methods and systems in accordance with the above embodiment, have used adaptation based on adaptive statistics. However, it is also possible to use prior statistics where the PCMLLR transform parameters are obtained by minimising the KL divergence between a CMLLR adapted distribution and a target distribution. This is a powerful technique when the target distribution is complex, e.g. full covariance, and the PCMLLR transform provides a computationally efficient approximation. Incorporation of prior statistics have been explained above with reference to equations (17) through to (22). This will allow robust transforms to be obtained with little data, but as the profile is updated with more data, the CMLLR statistics will begin to dominate.

In one embodiment, this form of prior statistics can be used to initialise new speaker profiles. In another embodiment, the structure of the adaptation transform derived from a speaker profile could depend on the amount of data available. For example, if a small number of frames are used then a diagonal transform might be appropriate. If a large number of frames are assigned to a speaker profile, then a full transform is expected to give larger performance gains.

A method in accordance with the above embodiments uses the same accumulated statistics for speaker clustering and for adaptation, making it efficient to implement and easy to integrate with speaker adaptation. Furthermore, selecting the most likely speaker profile for each segment maintains a direct link between speaker clustering and the likelihood criterion.

There are several possible modifications to this scheme. In one implementation, it is assumed that the speaker doesn't change between segments and so statistics for the current segment are accumulated using the previous best speaker transform. Then, at the speaker clustering stage, it is decided whether the speaker has changed or not.

An example of a method in accordance with an embodiment of the present invention will now be described.

The AMI dev set consists of audio data from two sets of four meetings (ES09a-d and IS09a-d). Each meeting has four speakers and the same speakers appear in each set of meetings. The first of these meetings (ES09a and IS09a) were used to train a CMLLR transform for each speaker. The resulting CMLLR transforms were then used to identify the current speaker for all segments in all meetings. For each segment, the auxiliary function Q(W) was used to select the best candidate from the set of well-trained transforms. The selected transform was then used in lattice rescoring to improve the baseline hypothesis. This proposed approach was compared to using the correct speaker transform identified using the oracle segment speaker labels.

Using the proposed speaker ID approach, roughly 18% of the segments were incorrectly classified as originating from the wrong speaker. However, most of these segments were short, and so corresponded to only 2.7% of speech frames being wrongly labelled. The subsequent word error rates obtained using these transforms are shown in the table below.

|  | WER |
| --- | --- |
| Baseline (no transform) | 29.9 |
| Proposed approach selecting most likely CMLLR | 29.4 |
| Oracle speaker CMLLR | 29.1 |

While certain embodiments have been described, these embodiments have been presented by way of example only, and are not intended to limit the scope of the inventions. Indeed novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method for identifying a plurality of speakers in audio data and for decoding the speech spoken by said speakers; the method comprising:
receiving speech;
dividing the speech into segments as it is received;
processing the received speech segment by segment in the order received to identify the speaker and to decode the speech, processing comprising:
performing primary decoding of the segment using an acoustic model and a language model;
obtaining segment parameters indicating the differences between the speaker of the segment and a base speaker during the primary decoding, comprising obtaining the parameters which allow a speaker transform to be estimated, said speaker transform adapting the speech of the speaker of the segment to that of the base speaker of the acoustic model;
comparing the segment parameters with a plurality of stored speaker profiles to determine the identity of the speaker, and selecting a speaker profile for said speaker;
updating the selected speaker profile using said segment parameters;

performing a further decoding of the segment using a speaker independent acoustic model, adapted using the updated speaker profile;

outputting the decoded speech for the identified speaker, wherein the speaker profiles are updated as further segments of speech relating to a speaker profile are processed.

2. A method according to claim 1, wherein if the segment parameters do not match closely enough with a stored speaker profile, a new speaker profile is initialised based on the parameters obtained for the segment.

3. A method according to claim 2, wherein a new speaker profile is initialised if the likelihood or value of auxiliary function is greater for a unity transform or generic transform than for one of the stored speaker profiles.

4. A method according to claim 2, wherein a new speaker profile is initialised if the likelihood or value of auxiliary function is less than a predetermined threshold.

5. A method according to claim 1, wherein the speaker transform is a MLLR or CMLLR transform.

6. A method according to claim 1, wherein the speaker profile comprises both adaptive and prior statistics.

7. A method according to claim 1, wherein the primary decoding uses a language model.

8. A method according to claim 1, wherein secondary decoding comprises rescoring a lattice of possible text corresponding to the segment.

9. A method according to claim 1, wherein dividing the input speech into segments comprises detecting where there is silence in the input speech.

10. A method according to claim 1, wherein the base speaker is a canonical speaker.

11. A method according to claim 1, wherein the base speaker is the speaker of a previous segment.

12. A non-transitory carrier medium carrying computer readable instructions for controlling the computer to carry out the method of claim 1.

13. A system for identifying a plurality of speakers in audio data and for decoding the speech spoken by said speakers;

the system comprising:
a receive for audio containing speech; and
a processor, said processor being adapted to:
divide the speech into segments as it is received;
process the received speech segment by segment in the order received to identify the speaker and to decode the speech, processing comprising:
perform primary decoding of the segment using an acoustic model and a language model;
obtain segment parameters indicating the differences between the speaker of the segment and a base speaker during the primary decoding,
wherein obtaining segment parameters comprises obtaining the parameters which allow a speaker transform to be estimated, said speaker transform adapting the speech of the speaker of the segment to that of the base speaker of the acoustic model;
compare the segment parameters with a plurality of stored speaker profiles to determine the identity of the speaker, and selecting a speaker profile for said speaker;
update the selected speaker profile using said segment parameters; and
perform a further decoding of the segment using a speaker independent acoustic model, adapted using the updated speaker profile,
the system further comprising an output for outputting the decoded speech for the identified speaker,
wherein the speaker profiles are updated as further segments of speech relating to a speaker profile are processed.

* * * * *